United States Patent
Bocklet et al.

(10) Patent No.: US 10,629,184 B2
(45) Date of Patent: Apr. 21, 2020

(54) CEPSTRAL VARIANCE NORMALIZATION FOR AUDIO FEATURE EXTRACTION

(71) Applicant: INTEL CORPORATION, Santa Clara, CA (US)

(72) Inventors: Tobias Bocklet, Munich (DE); Adam Marek, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 15/528,068

(22) PCT Filed: Dec. 22, 2014

(86) PCT No.: PCT/PL2014/000151
§ 371 (c)(1),
(2) Date: May 18, 2017

(87) PCT Pub. No.: WO2016/105216
PCT Pub. Date: Jun. 30, 2016

(65) Prior Publication Data
US 2018/0322863 A1    Nov. 8, 2018

(51) Int. Cl.
*G10L 15/02*    (2006.01)
*G10L 17/02*    (2013.01)
(Continued)

(52) U.S. Cl.
CPC ........... *G10L 15/02* (2013.01); *G10L 15/20* (2013.01); *G10L 17/02* (2013.01); *G10L 17/20* (2013.01); *G10L 19/008* (2013.01); *G10L 25/24* (2013.01)

(58) Field of Classification Search
USPC ................................ 704/200, 205–208, 214
See application file for complete search history.

(56) References Cited

U.S. PATENT DOCUMENTS 8,346,551 B2 * 1/2013 Herbig .................. G10L 15/065
                                                    704/244
9,378,729 B1 * 6/2016 Salvador ................ G10L 15/02
(Continued)

FOREIGN PATENT DOCUMENTS

| CN | 1839427 | 9/2006 |
| CN | 103280220 | 9/2013 |
| EP | 0865033 | 3/1999 |

OTHER PUBLICATIONS

International Searching Authority at the European Patent Office, International Search Report and Written Opinion for International Patent Application No. PCT/PL2014/000151, dated Jun. 19, 2015, 10 pages.
(Continued)

*Primary Examiner* — Leonard Saint Cyr
(74) *Attorney, Agent, or Firm* — Finch & Maloney PLLC (57) ABSTRACT

Cepstral variance normalization is described for audio feature extraction. In some embodiments a method includes receiving a sequence of frames of digitized audio from a microphone, determining a feature vector for a first frame of the sequence of frames, the feature vector being determined using an initial mean and an initial variance, updating the initial mean to a current mean using the determined feature vector for the first frame, updating the variance to a current variance using the current mean and the determined feature vector for the first frame, determining a next feature vector for each of subsequent frames of the sequence of frames, after determining a next feature vector for each subsequent frame, updating the current mean to a next current mean and updating the current variance to a next current variance and wherein determining a feature vector for a subsequent frame comprises using the next current mean and the next current
(Continued)

variance, and sending the determined feature vectors to a recognition stage of an audio processing pipeline.

22 Claims, 4 Drawing Sheets

(51) Int. Cl.
   *G10L 15/20* (2006.01)
   *G10L 17/20* (2013.01)
   *G10L 19/008* (2013.01)
   *G10L 25/24* (2013.01)

(56) References Cited

U.S. PATENT DOCUMENTS

| | | |
|---|---|---|
| 2005/0182621 A1 | 8/2005 | Zlokarnik et al. |
| 2006/0178871 A1* | 8/2006 | Seltzer .................. G10L 15/063 704/205 |
| 2007/0150263 A1* | 6/2007 | Zhang ..................... G10L 15/20 704/205 |
| 2014/0188470 A1* | 7/2014 | Chang ..................... G10L 15/14 704/236 |

OTHER PUBLICATIONS

Pujol, et al., On Real-Time Mean-and-Variance Normalization of Speech Recognition Features, Jan. 1, 2006, pp. 773-776.

Viikkii, et al., A Recursive Feature Vector Normalization Approach for Robust Speech Recognition in Noise, May 12, 1998, pp. 733-736.

Viikkii, et al., Noise Robust HMM-Based Speech Recognition Using Segmental Cepstral Feature Vector Normalization, Apr. 17-18, 1997, pp. 107-110.

International Preliminary Report on Patentability received for PCT Patent Application No. PCT/PL2014/000151, dated Jul. 6, 2017, 8 pages.

\* cited by examiner

CEPSTRAL VARIANCE NORMALIZATION FOR AUDIO FEATURE EXTRACTION

CROSS-REFERENCE TO RELATED APPLICATION

This patent application is a U.S. National Phase Application under 35 U.S.C. § 371 of International Application No. PCT/PL2014/000151, filed Dec. 22, 2014, entitled CEPSTRAL VARIANCE NORMALIZATION FOR AUDIO FEATURE EXTRACTION.

FIELD

The present description relates to audio processing and in particular to determining statistical values for cepstral coefficient feature vectors.

BACKGROUND

Voice or speech recognition is increasingly being used as a part of the user interface in computing devices of many different types. Many cellular telephones allow users to push a button and speak into the microphone to perform queries and execute a variety of different commands. Portable and desktop computers perform similar functions. These systems may also convert the speech to text and use this as text input for appointments, messages, or stored documents. Some of these systems process the user speech locally in the device, but many send a recording of the speech to a remote server. Automobiles may also receive voice commands and queries to operate a navigation system or other functions in the vehicle including making calls and sending messages. Voice or speech recognition is also used for identification, logon, and other purposes.

Users prefer a quick response to voice inputs; however, it may require significant processing resources to complete an accurate analysis of the speech or any other audio. In addition many speech analysis techniques are designed to receive a complete utterance and then analyze the complete utterance as a whole. This requires that the system wait for the user to stop speaking and then begin processing using the entire utterance. This inherent latency may be annoying especially when compared to the immediacy of keyboard and mouse inputs. For some systems, there may not be enough memory available to buffer the utterance so that speech analysis is not possible.

One technique used for speech recognition is to analyze the speech for Mel-Frequency Cepstral Coefficients (MFCCs). The MFCC's are compared to a reference for automatic speech recognition (ASR) and speaker recognition. In order to improve the accuracy and reliability of the MFCC, Cepstral Mean Subtraction (CMS) is used in combination with Cepstral Variance Normalization (CVN). CVN can be regarded as noise normalization in that the mean of the signal is subtracted which leads to the removal of stationary noise. These techniques allow the system to be used to good effect not only for user input purposes but also for user authentication and login passwords.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A technique for cepstral variance normalization is described that may be performed in real time locally in a small, portable, or fixed device for verifying the identity of the speaker, understanding a command, and for other applications.

To perform CMS (Cepstral Mean Subtraction) and CVN (Cepstral Variance Normalization) in MFCCs (Mel-Frequency Cepstral Coefficients) the mean and variance of the MFCCs is estimated on a complete audio file. The estimates are then used to apply the normalizations frame-wise on the audio file. As described herein, CVN may be performed as the audio is received sample-by-sample. This may be done without any buffering. Using the described technique, the accuracy of recognition is greatly improved over real-time feature extraction without normalization and is similar to that of offline feature extraction performed in forensics analysis.

A typical technique for determining CMS and CVN offline using the entire audio file may be stated in the form of the equation below.

$$\hat{f}(x_i) = \frac{f(x_i) - \mu}{\sigma} \qquad \text{Eq. 1}$$

where $x_i$ denotes the speech signal at time step $i$, $f(x_i)$ denotes the feature extraction function, $\mu$ denotes the estimated mean of all features, $\sigma$ denotes the estimated variance. $\mu$ and $\sigma$ are required prior to normalization. This, however, requires a preprocessing of all features of an audio file. As shown the features are normalized by taking the feature for each frame, subtracting the mean and diving by the variance. These are summed for an overall value for the utterance.

The determination of the mean $\mu$ over all frames may be done as follows:

$$\mu = \frac{1}{N} \sum_{i=0}^{N-1} f(x_i) \qquad \text{Eq. 2}$$

wherein N denotes the number of frames.

Similarly having determined $\mu$, the variance $\sigma$ of the mean may be determined as follows:

$$\sigma^2 = \frac{1}{N} \sum_{i=0}^{N-1} (f(x_i) - \mu)^2 \qquad \text{Eq. 3}$$

N denotes the number of frames.

In order to determine useful values of the features without first determining a mean and a variance, Equation 1 may be changed as follows:

$$\hat{f}(x_i) = \frac{f(x_i) - \mu_{i-1}}{\sigma_{i-1}} \qquad \text{Eq. 4}$$

In this case, the mean and variance values are replaced with an interim mean and variance that is determined up to and including the most recent frame. These values $\mu_{i-1}$ and $\sigma_{i-1}$ are updated for each new frame $x_i$. The mean and variance after each sample are determined as follows:

$$\mu_i = (1-\alpha)\mu_{i-1} + \alpha f(x_i) \qquad \text{Eq. 5}$$

$$\sigma_i^2 = (1-\alpha)\sigma_{i-1}^2 + \alpha(f(x_i) - \mu_i)^2 \qquad \text{Eq. 6}$$

As shown, each new mean value $\mu_i$ is determined by using the previous value $\mu_{i-1}$ factored by a parameter $\alpha$ and adjusted by a factored current value of the feature $f(x_i)$. The same approach may be used with the variance, where the current variance $\sigma_i^2$ is determined by using the previous value factored by a parameter $\alpha$ and adjusted by a factored current value of the feature $f(x_i)$.

Figure 1:
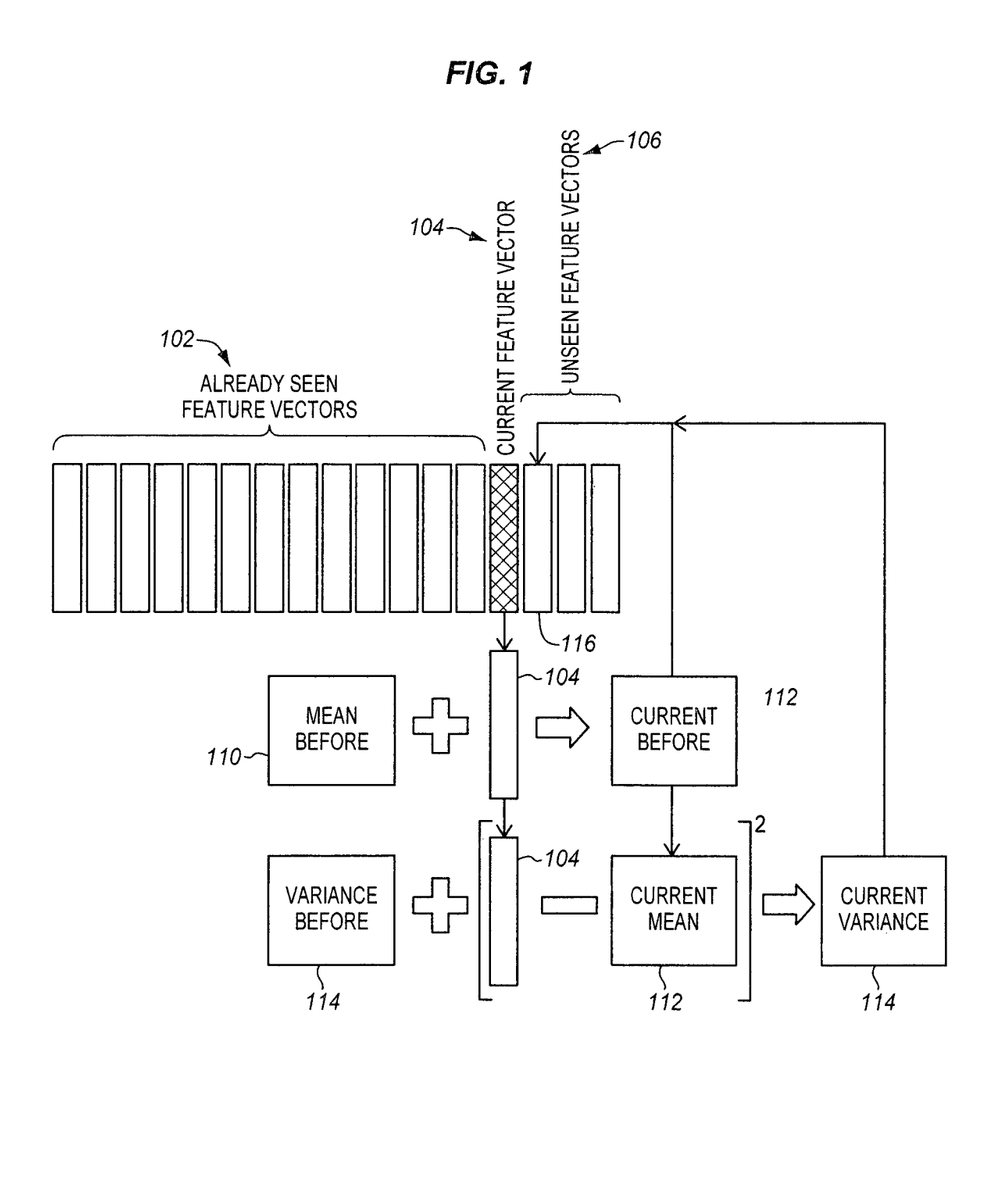
FIG. 1 is a diagram of feature vector calculation for a stream of audio samples in an audio pipeline according to an embodiment.

The higher the relevance parameter $\alpha$ is, the more emphasis is put on the actual frame currently being processed, i.e. the $i^{th}$ frame. This technique for in line real time normalization does not introduce any latency or delay as the estimated mean $\mu$ and the estimated variance a are updated with each subsequent frame. The estimated mean and variance rely only on frames that the system has already seen as it processes the audio as the audio is received. There is no look ahead required. This is depicted in FIG. 1. In addition, the memory requirements are very small because only the two values for the last frame are used and these are updated with each frame.

FIG. 1 is a diagram of feature vector calculation to indicate how feature vectors may be determined as audio is being received. Feature vectors are arriving from right to left with the most recently received feature vectors on the right. The current mean 112 and the current variance 114 are used to determine the incoming feature vector 116. As the feature vectors move to the left, the incoming feature vector 116 becomes the current feature vector 104. The current feature vector 104 is then used to update the prior mean 110 to determine the current mean 112. Similarly, the prior variance 114 is used together with the new current mean 112 to determine the current variance 114. The current mean and variance are then plugged into determining or processing the upcoming unused feature vector 116.

The already seen feature vectors 102 increase as the current feature vector 104 moves to the left and unseen feature vectors 106 become the current feature vector 104 and then the already seen feature vectors 102. The feature vectors may be summed or analyzed as they are produced so that the analysis may be finished almost immediately after the end of the utterance.

The same principles set forth in Equations 4, 5, and 6 may also be expressed in pseudo code. In the example below "feat" denotes a feature vector.

```
if((numberFrame == 0) && (init) ){
    for(j=0;j<feat.length;j++){
        mean[j] = initMean[j];
        sigsq[j] = initsig[j];
    }
} else if( (numberFrame == 0) && (!init)){
    for(j=0;j<feat.length;j++){
        mean[j] = feat[j];
        sigsq[j] = feat[j] * feat[j];
    }
```

```
} else {
    for(j=0;j<feat.length;j++){
        mean[j] = (mean[j]*(1-alpha)) + (alpha * feat[j]);
        sigsq[j] = sigsq[j]*(1-alpha) +
                    (alpha * ((feat[j]-mean[j]) * (feat[j]-
    mean[j])) );
    }
}
for (j = 0; j < feat.length; j++) {
    feat[j] -= mean[j];
    feat[j] /= Math.sqrt(sigsq[j]);
}
numberFrame++;
```

As shown, the whole audio file need not be read and buffered. The memory requirements latency from buffering the whole audio stream is avoided. This is particularly valuable for using speaker recognition for logins and for voice authentication.

The described CVN may be used to improve an online feature extraction system. The described online CMS and CVN may be performed without introducing any latency. The CVN does not require any offline processing and estimates the variance based on already seen data. During runtime, the variance is updated with every new feature frame.

The online CVN provides a performance in voice recognition that is similar to conventional offline techniques without requiring any form of feature buffering and without producing latency because the system does not require any knowledge of future feature frames.

The online techniques herein may be used with only CMS or CMS may be combined with CVN. A further modification may be made by initializing the mean $\mu$ and the variance $\sigma$ to some value before the processing is started. Initial values for mean and variance can be specified by estimating appropriate values empirically using similar hardware. This may provide a significant improvement for determining early features. However, the advantages of the initial values are diminished as more features vectors are received.

Figure 2:
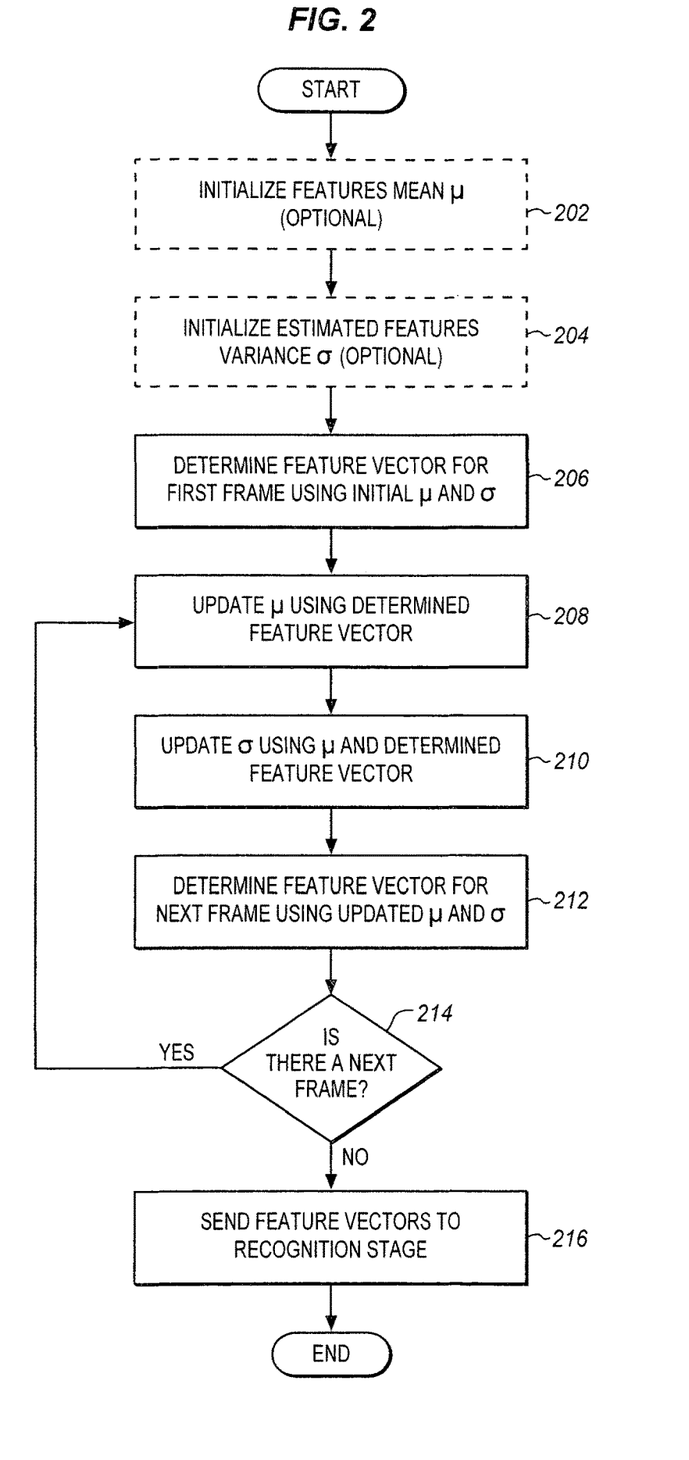
FIG. 2 is a process flow diagram of feature vector determination for a steam of audio samples according to an embodiment.

FIG. 2 is a process flow diagram of determining a CMS and a CVN online or in real-time as audio frames arrive. The system starts based on receiving audio frames from a microphone or other source. The audio may be processed or formatted in any of a variety of different ways. Typically the audio is in a digital sample format. At 202, the CMS ($\mu$) value is optionally initialized and at 204, the CVN ($\alpha$) values are optionally initialized. These may be initialized to zero, to a middle value, or to some accurate estimate of a typical value for the particular type of audio and the hardware system that is receiving the audio.

At 206, a feature vector is determined for the first frame in the received audio. This may be done as described in the context of Equation 4. The initialization of the mean and variance of 202 is optional. If there is no initialization then the values from the first frame's feature vector may be used. In other words the mean $\mu$ is set equal to the feature value and the variance will be zero because there is only one mean value. For the next frame the same values from the first frame's feature vector may be used again as the values for the previous frame. As a further alternative, if there is no initialization then 0 may be used for $\mu$ and 1 may be used for $\sigma$. The second frame will then use the values from the first frame. The determination of the first frame's feature vector may be performed before the last frame has been received. The feature vector processing may start as soon as the first frame is received.

At 208 μ is updated using the determined feature vector. If there is no initialization and this is the first frame then updating μ corresponds to establishing μ in the first instance using the feature value for the first frame. At 210 σ is updated using the updated μ and the determined feature vector. If μ and σ were initialized then the initial values may be included in this updating process. An example updating process is set forth in Equations 5 and 6. If there is no initialized value, then the values of the first frame may be used as initial values, e.g. μ=(feature vector) and σ=(feature vector)*(feature vector). So equations 5 and 6 will be processed with these initial values for the first frame. If instead there are no initial values at all, that is if there is no current value of μ and σ to be updated, then the first terms in Equations 5 and 6 drop out for the first frame.

At 212, the feature vector for the next frame is determined using the updated μ and σ values. This process of updating μ and σ and determining feature vectors continues until the entire utterance is processed. At 214, it is determined whether there is a next frame. The operations continue until all of the frames are processed. At that time the feature vectors are sent to the recognition stage (216) and the process ends.

Figure 3:
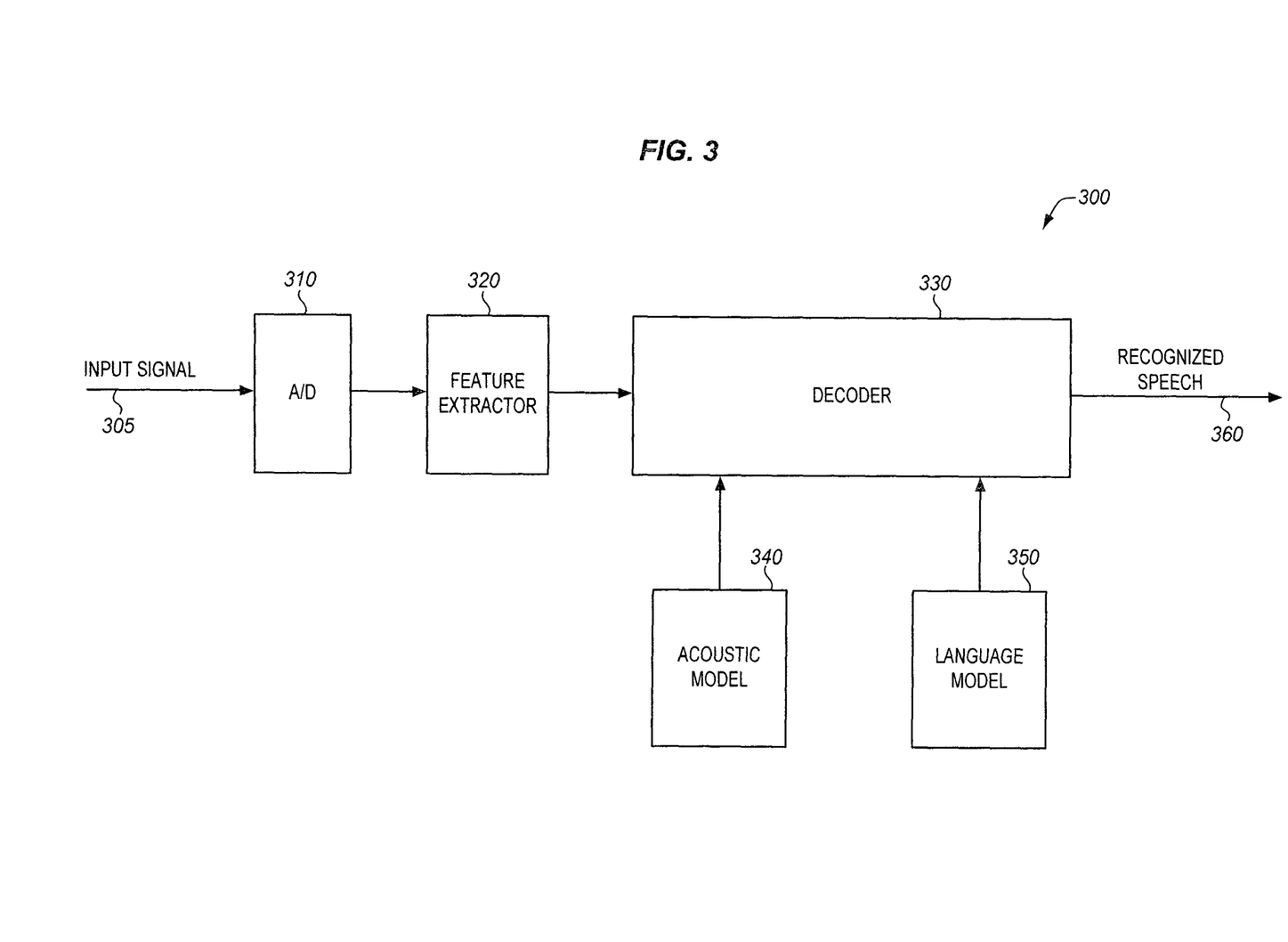
FIG. 3 is a block diagram of a speech recognition system according to an embodiment.

FIG. 3 is a block diagram of a speech recognition system 300 which may use feature vectors and CMS and CVN values determined as described herein. While embodiments are described in the context of a speech recognition system, the approach described herein and in the context of FIG. 3 is not restricted to speech recognition, but may also be used with speaker recognition or authentication, language recognition, speaker diarization, etc. An input signal, such as speech from a microphone, is received at an analog to digital converter (A/D) 310. A feature extractor or spectral analysis unit 320 receives digitized speech frames from the A/D. A decoder 330 compares the extracted features received from the feature extractor to a connected acoustic model 340, and a connected language model 350 and produces recognized speech 360 or commands as an output.

The input signal 305 represents the input speech or some other audio. It is first digitized using the A/D 310. The digital signal is then sliced up into frames typically of 10, 15, or 20 ms in the A/D or the feature extractor. Each frame of the signal is then converted into a corresponding feature vector which is used to characterize the spectral properties of the input signal.

The feature vector may have one or more dimensions and may include one or more different components. These components may include, for example MFCC components, delta MFCCs, and delta-delta MFCCs. The feature vectors generated by the feature extractor unit 320 are then submitted into the decoder 330 which determines whether the speech matches an authenticated user with enough accuracy. Alternatively, it may determine a sentence or a sequence of words that has the highest probability given the acoustic events characterized by the feature vectors. This is done using any of a variety of different models 340, 350 or analysis. The recognized speech 360 may then be provided for storage, execution, or communication to others.

Figure 4:
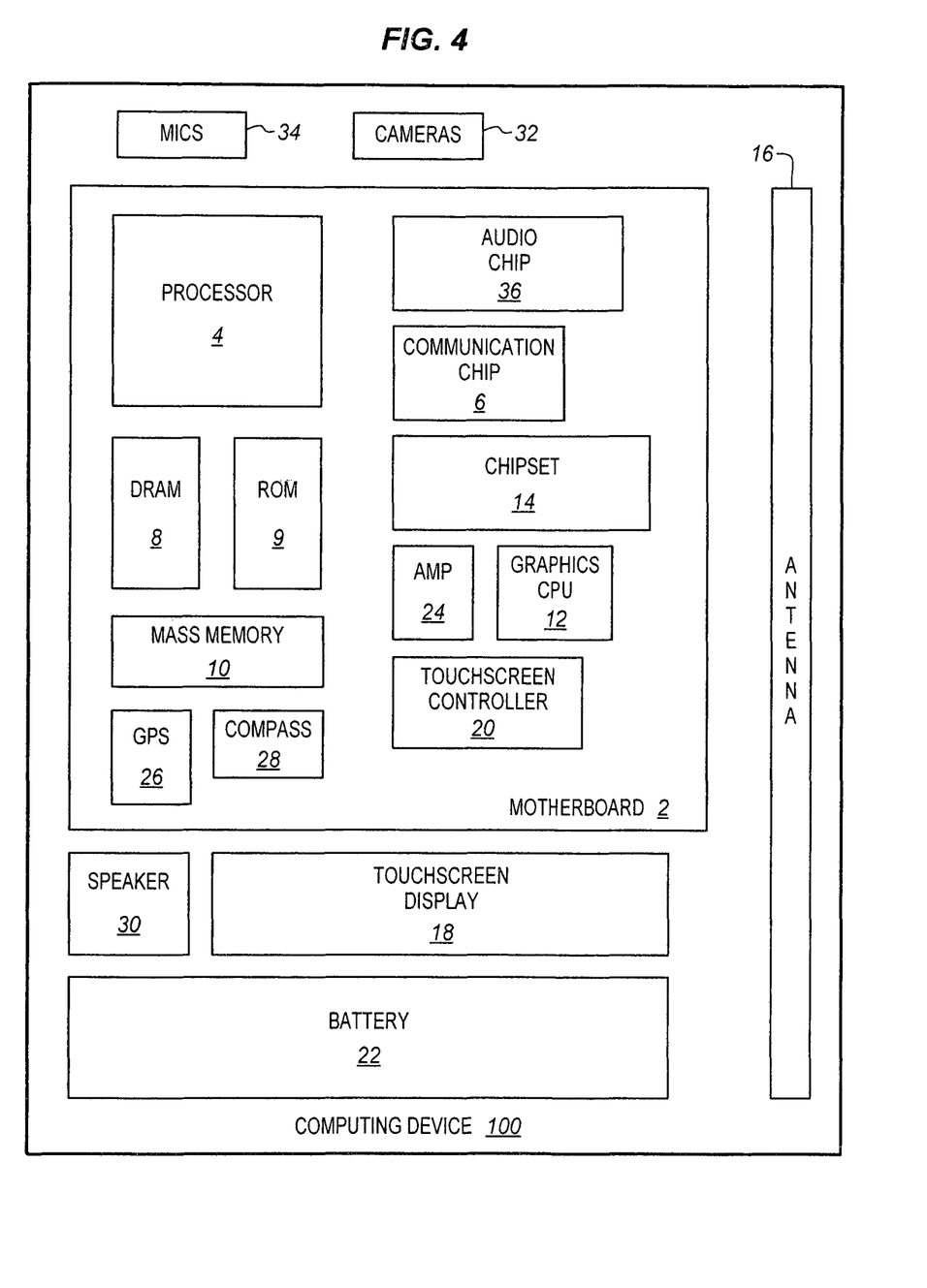
FIG. 4 is a block diagram of a computing device incorporating audio processing according to an embodiment.

FIG. 4 illustrates a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The microphones 34 and the speaker 30 are coupled to one or more audio chips 36 to perform digital conversion, feature extraction, encoding and decoding, and frame based processing as described herein. The processor 4 is coupled to the audio chip, through an audio front end, for example, to drive the process with interrupts, set parameters, and control operations of the audio chip. Frame-based processing may be performed in the audio chip or in the communication package 6. Power management functions may be performed by the processor, coupled to the battery 22 or a separate power management chip may be used.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a sequence of frames of digitized audio from a microphone, determining a feature vector for a first frame of the sequence of frames, the feature vector being determined using an initial mean and an initial variance, updating the initial mean to a current mean using the determined feature vector for the first frame, updating the variance to a current variance using the current mean and the determined feature vector for the first frame, determining a next feature vector for each of subsequent frames of the sequence of frames, after determining a next feature vector for each subsequent frame, updating the current mean to a next current mean and updating the current variance to a next current variance and wherein determining a feature vector for a subsequent frame comprises using the next current mean and the next current variance, and sending the determined feature vectors to a recognition stage of an audio processing pipeline.

Further embodiments include setting the initial mean and variance to estimated values for the digitized audio.

In further embodiments the initial mean and variance are set based on the feature vector determined for the first frame.

In further embodiments determining a feature vector comprises determining a mel-frequency cepstral coefficient.

In further embodiments the current mean comprises a cepstral mean and the current variance comprises a cepstral variance.

In further embodiments determining a next feature vector comprises determining a next feature vector using cepstral mean substraction and cepstral variance normalization.

In further embodiments the digitized audio is speech.

In further embodiments the recognition stage comprises a decoder, the method further comprising receiving the determined feature vectors at the decoder and determining at the decoder whether the digitized speech matches an authenticated user.

In further embodiments the next current mean is determined after each next feature vector using only the corresponding next feature vector and feature vectors of earlier frames of the sequence of frames.

In further embodiments the next current variance is determined after each next feature vector using only the corresponding next current mean.

Some embodiments pertain to a machine-readable medium having instructions thereon that, when executed by the machine, cause the machine to perform operations that include receiving a sequence of frames of digitized audio from a microphone, determining a feature vector for a first frame of the sequence of frames, the feature vector being determined using an initial mean and an initial variance, updating the initial mean to a current mean using the determined feature vector for the first frame, updating the variance to a current variance using the current mean and the determined feature vector for the first frame, determining a next feature vector for each of subsequent frames of the sequence of frames, after determining a next feature vector for each subsequent frame, updating the current mean to a next current mean and updating the current variance to a next current variance and wherein determining a feature vector for a subsequent frame comprises using the next current mean and the next current variance, and sending the determined feature vectors to a recognition stage of an audio processing pipeline.

In further embodiments determining a feature vector comprises determining a mel-frequency cepstral coefficient.

In further embodiments the current mean comprises a cepstral mean and the current variance comprises a cepstral variance.

In further embodiments determining a next feature vector comprises determining a next feature vector using cepstral mean substraction and cepstral variance normalization.

In further embodiments the next current mean is determined after each next feature vector using only the corresponding next feature vector and feature vectors of earlier frames of the sequence of frames.

In further embodiments the next current variance is determined after each next feature vector using only the corresponding next current mean.

Some embodiments pertain to an apparatus that includes a feature extractor to receive a sequence of frames of digitized audio from a microphone through an analog to digital converter, to determine a feature vector for a first frame of the sequence of frames, the feature vector being determined using an initial mean and an initial variance, to update the initial mean to a current mean using the determined feature vector for the first frame, to update the variance to a current variance using the current mean and the determined feature vector for the first frame, to determine a next feature vector for each of subsequent frames of the sequence of frames, to update the current mean to a next current mean and update the current variance to a next current variance after determining a next feature vector for each subsequent frame, wherein determining a feature vector for a subsequent frame comprises using the next current mean and the next current variance, and a recognition stage to recognize the extracted feature vectors.

In further embodiments the digitized audio is speech.

In further embodiments the recognition stage comprises a decoder, the decoder receiving the determined feature vectors and determining whether the digitized speech matches an authenticated user.

In further embodiments the next current mean is determined after each next feature vector using only the corresponding next feature vector and feature vectors of earlier frames of the sequence of frames.

Some embodiments pertain to an apparatus that includes means for receiving a sequence of frames of digitized audio from a microphone, means for determining a feature vector for a first frame of the sequence of frames, the feature vector being determined using an initial mean and an initial variance, means for updating the initial mean to a current mean using the determined feature vector for the first frame, means for updating the variance to a current variance using the current mean and the determined feature vector for the first frame, means for determining a next feature vector for each of subsequent frames of the sequence of frames, for updating the current mean to a next current mean and updating the current variance to a next current variance after determining a next feature vector for each subsequent frame and wherein determining a feature vector for a subsequent frame comprises using the next current mean and the next current variance, and means for sending the determined feature vectors to a recognition stage of an audio processing pipeline.

In further embodiments the initial mean and variance are set based on the feature vector determined for the first frame.

In further embodiments determining a feature vector comprises determining a mel-frequency cepstral coefficient.

In further embodiments the current mean comprises a cepstral mean and the current variance comprises a cepstral variance.

In further embodiments determining a next feature vector comprises determining a next feature vector using cepstral mean substraction and cepstral variance normalization.

In further embodiments the recognition stage comprises means for decoding, the means for decoding determining whether the digitized speech matches an authenticated user.

Some embodiments pertain to a computing system that includes a plurality of microphones to receive speech, an analog to digital converter to convert the speech to a sequence of frames of digitized audio, a feature extractor to receive the sequence of frames of digitized audio from the analog to digital converter, to determine a feature vector for a first frame of the sequence of frames, the feature vector being determined using an initial mean and an initial variance, to update the initial mean to a current mean using the determined feature vector for the first frame, to update the variance to a current variance using the current mean and the determined feature vector for the first frame, to determine a next feature vector for each of subsequent frames of the sequence of frames, to update the current mean to a next current mean and update the current variance to a next current variance after determining a next feature vector for each subsequent frame, wherein determining a feature vector for a subsequent frame comprises using the next current mean and the next current variance, and a recognition stage to recognize the extracted feature vectors.

In further embodiments decoder, the decoder receiving the determined feature vectors and determining whether the digitized speech matches an authenticated user.

What is claimed is:

1. A non-transitory machine-readable medium having instructions thereon that, when executed by the machine, cause the machine to perform operations comprising:
   receiving a sequence of frames of digitized audio from a microphone;
   during a first iteration, normalizing a first feature vector for a first frame of the sequence of frames, the feature vector being determined using an initial mean and an initial variance;
   during the first iteration, updating (i) the initial mean to a current mean using the determined feature vector for the first frame, and (ii) the initial variance to a current variance using the current mean and the determined feature vector for the first frame;
   iteratively perform the following (i) and (ii) for the frames of the sequence of frames
      (i) at an $i^{th}$ iteration, normalizing an $i^{th}$ feature vector using (a) mean $\mu(i-1)$, (b) variance $\sigma(i-1)$, and (c) an $i^{th}$ frame of the sequence of frames, wherein the mean $\mu(i-1)$ and the variance $\sigma(i-1)$ are determined at an immediate previous $(i-1)^{th}$ iteration based on an $(i-1)^{th}$ feature vector, and wherein i =2, . . . , N, where N is 3 or higher, and
      (ii) at the $i^{th}$ iteration and subsequent to normalizing the $i^{th}$ feature vector, determining mean $\mu(i)$ and variance $\sigma(i)$ based on the normalized $i^{th}$ feature vector; and
   sending the normalized feature vectors to a recognition stage of an audio processing pipeline.

2. The medium of claim 1, wherein normalizing a feature vector comprises determining a mel-frequency cepstral coefficient.

3. The medium of claim 2, wherein the mean $\mu(i)$ comprises a cepstral mean and the variance $\sigma(i)$ comprises a cepstral variance.

4. The medium of claim 1, wherein normalizing the $i^{th}$ feature vector comprises determining a cepstral mean substraction and cepstral variance normalization.

5. The medium of claim 1, wherein the mean $\mu(i)$ is determined based on the $i^{th}$ feature vector and the mean $\mu(i-1)$.

6. The medium of claim 1, wherein the variance $\sigma(i)$ is determined based on the mean $\mu(i)$, the variance $\sigma(i-1)$, and the $i^{th}$ feature vector.

7. An apparatus comprising:
   one or more processors;
   a feature extractor executable by the one or more processors to
      receive a sequence of frames of digitized audio from a microphone through an analog to digital converter,
      determine and normalize a first feature vector for a first frame of the sequence of frames, the normalized first feature vector being determined using an initial mean and an initial variance,
      subsequent to determining and normalizing the first feature vector, determine a first mean and a first variance, based on the first feature vector;
      determine and normalize a second feature vector for a second frame of the sequence of frames, the normalized second feature vector being determined using the first mean and the first variance;

subsequent to determining and normalizing the second feature vector, determine a second mean and a second variance, based on the second feature vector; and a recognition stage to recognize the normalized feature vectors.

8. The apparatus of claim 7, wherein the digitized audio is speech.

9. The apparatus of claim 7, wherein the recognition stage comprises a decoder, the decoder receiving the normalized feature vectors and determining whether the digitized speech matches an authenticated user.

10. The apparatus of claim 7, wherein the second mean is determined using the normalized second feature vector and the initial mean.

11. An computing system comprising:
a plurality of microphones to receive speech;
an analog to digital converter to convert the speech to a sequence of frames of digitized audio;
a feature extractor to:
receive the sequence of frames of digitized audio from the analog to digital converter,
during a first iteration, normalize a first feature vector for a first frame of the sequence of frames, the first feature vector being normalized using an initial mean and an initial variance,
during the first iteration, update the initial mean to a first mean $\mu(1)$ using the normalized first feature vector for the first frame, and (ii) update the initial variance to a first variance $\sigma(1)$ using the first mean $\mu(1)$ and the determined feature vector for the first frame,
iteratively perform the following (i) and (ii) for the frames of the sequence of frames
(i) at an $i^{th}$ iteration, normalize an $i^{th}$ feature vector using (a) mean $\mu(i-1)$, (b) variance $\sigma(i-1)$, and (c) an $i^{th}$ frame of the sequence of frames, wherein the mean $\mu(i-1)$ and the variance $\sigma(i-1)$ are determined at an immediate previous $(i-1)^{th}$ iteration based on an $(i-1)^{th}$ feature vector, and wherein $i = 2, \ldots, N$, where N is 3 or higher, and
(ii) at the $i^{th}$ iteration and subsequent to normalizing the $i^{th}$ feature vector, determine mean $\mu(i)$ and variance $\sigma(i)$ based on the normalized $i^{th}$ feature vector; and
a recognition stage to recognize the extracted normalized feature vectors.

12. The computing device of claim 11, wherein the recognition stage comprises a decoder, the decoder receiving the determined feature vectors and determining whether the digitized speech matches an authenticated user.

13. A method comprising:
receiving a sequence of frames of digitized audio from a microphone;
normalizing a first feature vector for a first frame of the sequence of frames, the first feature vector being determined using an initial mean and an initial variance;
updating the initial mean to a mean $\mu(1)$ using the normalized first feature vector for the first frame;
updating the variance to a variance $\sigma(11)$ using the mean $\mu(1)$ and the determined normalized first feature vector for the first frame;
iteratively perform the following (i) and (ii) for the frames of the sequence of frames
(i) at an $i^{th}$ iteration, normalizing an $i^{th}$ feature vector using (a) mean $\mu(i-1)$, (b) variance $\sigma(i-1)$, and (c) an $i^{th}$ frame of the sequence of frames, wherein the mean $\mu(i-1)$ and the variance $\sigma(i-1)$ are determined at an immediate previous $(i-1)^{th}$ iteration based on an $(i-1)^{th}$ feature vector, and wherein $i = 2, \ldots, N$, where N is a number of frames in the sequence of frames, and
(ii) at the $i^{th}$ iteration and subsequent to normalizing the $i^{th}$ feature vector, updating mean $\mu(i)$ and variance $\sigma(i)$ based on the normalized $i^{th}$ feature vector; and
sending the normalized feature vectors to a recognition stage of an audio processing pipeline.

14. The method of claim 13, further comprising setting the initial mean and variance to estimated values for the digitized audio.

15. The method of claim 13, wherein the initial mean and variance are set based on the feature vector determined for the first frame.

16. The method of claim 13, wherein determining a feature vector comprises determining a mel-frequency cepstral coefficient.

17. The method of claim 16, wherein the mean $\mu(i)$ comprises a cepstral mean and the variance $\sigma(i)$ comprises a cepstral variance.

18. The method of claim 17, wherein normalizing a feature vector comprises determining a cepstral mean subtraction and cepstral variance normalization.

19. The method of claim 13, wherein the digitized audio is speech.

20. The method of claim 13, wherein the recognition stage comprises a decoder, the method further comprising receiving the normalized feature vectors at the decoder and determining at the decoder whether the digitized speech matches an authenticated user.

21. The method of claim 13, wherein the mean $\sigma(i)$ is determined based on the mean $\mu(i)$, the variance $\sigma(i-1)$, and the $i^{th}$ feature vector.

22. The method of claim 21, wherein the variance $\sigma(i)$ is determined based on the mean $\mu(i)$, the variance $\sigma(i-1)$, and the $i^{th}$ feature vector.

* * * * *